(12) United States Patent
Srb-Gaffron

(10) Patent No.: US 9,233,798 B2
(45) Date of Patent: Jan. 12, 2016

(54) SEAL ASSEMBLY FOR A BEARING ASSEMBLY

(75) Inventor: Walter Srb-Gaffron, Baden (AT)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 14/009,413

(22) PCT Filed: May 9, 2011

(86) PCT No.: PCT/US2011/035730
§ 371 (c)(1),
(2), (4) Date: Oct. 2, 2013

(87) PCT Pub. No.: WO2012/154166
PCT Pub. Date: Nov. 15, 2012

(65) Prior Publication Data
US 2014/0057768 A1  Feb. 27, 2014

(51) Int. Cl.
| F16C 19/06 | (2006.01) |
| B65G 39/09 | (2006.01) |
| B65G 39/10 | (2006.01) |
| B66B 23/14 | (2006.01) |
| F16J 15/34 | (2006.01) |

(52) U.S. Cl.
CPC .............. B65G 39/10 (2013.01); B66B 23/145 (2013.01); F16J 15/3464 (2013.01)

(58) Field of Classification Search
USPC ............ 193/37; 198/780; 384/449, 477, 489, 384/537
See application file for complete search history.

(56) References Cited

U.S. PATENT DOCUMENTS

| 3,964,124 A | | 6/1976 | Crawford |
| 4,006,945 A | * | 2/1977 | Sekerich ......................... 384/18 |
| 4,101,180 A | * | 7/1978 | Anderson et al. ............. 384/418 |
| 4,318,204 A | | 3/1982 | Black |
| 5,234,100 A | * | 8/1993 | Cook ............................. 198/842 |
| 5,293,982 A | * | 3/1994 | Ahls et al. ..................... 198/332 |
| 5,383,549 A | * | 1/1995 | Mayer ........................... 198/842 |
| 5,447,377 A | | 9/1995 | Baumgartner et al. |
| 5,806,653 A | * | 9/1998 | Ahls et al. ..................... 198/326 |
| 6,070,711 A | * | 6/2000 | Murano et al. ................ 198/779 |
| 6,280,097 B1 | * | 8/2001 | Mues et al. .................... 384/569 |

(Continued)

FOREIGN PATENT DOCUMENTS

| CN | 200940033 Y | 8/2007 |
| CN | 201046879 Y | 4/2008 |

(Continued)

OTHER PUBLICATIONS

International Search Report and Written Opinion for PCT Application No. PCT/US2011/035730, dated Apr. 6, 2012, pp. 1-12.

(Continued)

*Primary Examiner* — Douglas Hess
(74) *Attorney, Agent, or Firm* — Cantor Colburn LLP

(57) ABSTRACT

A passenger conveyor assembly including a roller assembly having an axle member, a bearing member mounted to the axle member, and a roller member rotatably mounted to the bearing member. A seal assembly is mounted to the roller assembly. The seal assembly includes a rotating member mounted for rotation with the roller member and a stationary member fixedly mounted relative to axel member. The rotating member and stationary member cooperate to substantially prevent foreign objects from accumulating at one of the bearing member and the axle member.

18 Claims, 4 Drawing Sheets

(56) References Cited

U.S. PATENT DOCUMENTS

| | | | |
|---|---|---|---|
| 6,287,014 B1 | 9/2001 | Salla | |
| 6,814,213 B2 * | 11/2004 | Dyson et al. | 193/37 |
| 7,537,389 B1 * | 5/2009 | McCafferty | 384/499 |
| 8,528,716 B2 * | 9/2013 | Lanzki et al. | 198/333 |
| 8,646,984 B2 * | 2/2014 | Gagnon | 384/480 |
| 2006/0144672 A1 | 7/2006 | Thaler et al. | |
| 2008/0078648 A1 | 4/2008 | Orlowski et al. | |

FOREIGN PATENT DOCUMENTS

| | | |
|---|---|---|
| CN | 201605080 U | 10/2010 |
| EP | 1148006 A1 | 10/2001 |
| JP | 5313788 A | 2/1978 |
| JP | 56112307 U | 9/1981 |
| WO | 2012154166 A1 | 11/2012 |

OTHER PUBLICATIONS

International Preliminary Report on Patentability for PCT Application No. PCT/US2011/035730, dated Nov. 21, 2013, pp. 1-9.

Chinese Office Action for CN Application No. 201180070709.3, dated Aug. 18, 2014, pp. 1-21.

English Translation of Japanese Office Action for JP Application No. 2014-510283, dated Jan. 6, 2014, pp. 1-3.

English Translation of Korean Office Action for KR Application No. 10-2013-7032529, dated Apr. 21, 2015, pp. 1-6.

* cited by examiner

US 9,233,798 B2

SEAL ASSEMBLY FOR A BEARING ASSEMBLY

CROSS-REFERENCE TO RELATED APPLICATION

This application is a National Stage Application of PCT Application No. PCT/US2011/035730 filed May 9, 2011, the disclosure of which is incorporated by reference herein in its entirety.

BACKGROUND OF THE INVENTION

Exemplary embodiments pertain to the art of bearing assemblies and, more particularly, to a seal assembly for a bearing assembly.

Bearings are used in a wide range of application to reduce frictional effects that may occur between two components moving one relative to another. For example, escalators employ a number of bearings to reduce friction that may be generated between rollers and rails as escalator steps travel between floors. Escalators have been used for years to transport people from one level to another in numerous applications. Conventionally, escalators include a plurality of steps that are moved along rails that extend from a first end positioned at a first level or floor and a second end positioned at a second level or floor. The steps include rollers that travel along the rails. The steps are configured to nest one against the other at each of the first and second ends to provide a smooth transition to the first and second floors. Typically, escalators are employed in office buildings, shopping centers, museums, as well as numerous other indoor installations. Escalators are also employed in outdoor locations such as at train stations, metro/subway stations, stadiums and the like. Outdoor installations expose the rollers and associated roller assemblies to foreign objects such as water, dust, other debris and the like. As such, the rollers are provided with seals that are configures to damage to bearings, shafts and the like from foreign objects.

BRIEF DESCRIPTION OF THE INVENTION

Disclosed is a passenger conveyor assembly including a roller assembly having an axle member, a bearing member mounted to the axle member, and a roller member rotatably mounted to the bearing member. A seal assembly is mounted to the roller assembly. The seal assembly includes a rotating member mounted for rotation with the roller member and a stationary member fixedly mounted relative to axel member. The rotating member and stationary member cooperate to substantially prevent foreign objects from accumulating at one of the bearing member and the axle member.

Also disclosed is a seal assembly including a rotating member configured and disposed to be mounted for rotation with a roller member, and a stationary member configured and disposed to be fixedly mounted relative to an axel. The rotating member and stationary member cooperate to substantially prevent foreign objects from contacting one of an associated bearing member and axle member.

Additionally or alternatively, the invention may include one or more of the following elements in various combinations:

an annular cavity between a surface section of the rotating member and a surface portion of the stationary member;

a lubricant substantially filling the annular cavity;

a high viscosity and low specific weight lubricant;

a surface section and a surface portion that extend radially and in close axial proximity; and/or a conical surface that is formed by the cooperation of the outer circumferential edge portions of the rotating member and the stationary member to direct foreign objects away from an interface of the rotating member and the stationary member.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
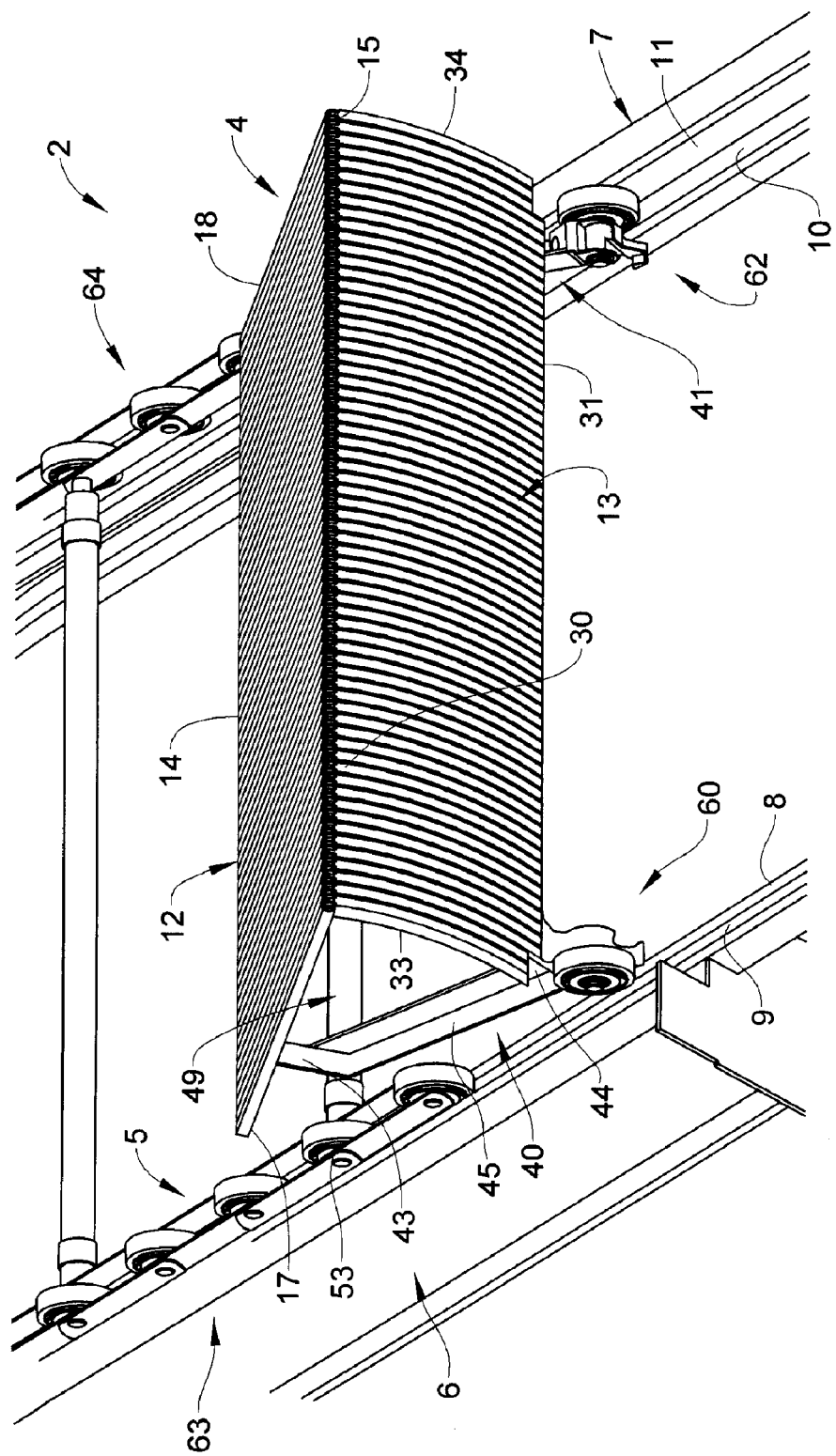
FIG. 1 is a perspective view of an escalator step including roller assemblies having a seal assembly in accordance with an exemplary embodiment.

A passenger conveyor assembly, shown in the form of an escalator step assembly in accordance with an exemplary embodiment is indicated generally at 2 in FIG. 1. Step assembly 2 includes a step member 4 that is engaged with a pair of step chains 5 (a portion of each of which has been removed to more clearly show step assembly 2) and moveably mounted between first and second rails 6 and 7. First rail 6 includes a step roller track 8 and a step chain roller track 9. Similarly, second rail 7 includes a step roller track 10 and a step chain roller track 11. Step member 4, along with additional step members (not shown) travels between first and second end portions (also not shown) of rails 6 and 7. Step member 4 includes a tread surface 12 joined to a riser surface 13. Tread surface 12 includes a first end 14 that extends to a second end 15. Tread surface 12 also includes a first side 17 that extends to a second side 18. Riser surface 13 includes a first end portion 30 that extends from second end 15 of tread surface 12 to a second end portion 31. Riser surface 13 also includes a first side portion 33 and a second side portion 34.

Step assembly 2 includes a first step arm 40 that extends between tread surface 12 and riser surface 13. Step arm 40 includes a first end section 43 that extends to a second end section 44 through an intermediate section 45. First end section 43 is joined adjacent to first end 14 of tread surface 12 while second end section 44 is joined adjacent to first end portion 30 of riser surface 13. Step assembly 2 also includes a second step arm (not shown) located oppositely of first step arm 40 that joins tread surface 12 with riser surface 13 between first end 14 and second end portions 31. Step arm 40 supports a step axle 49 adjacent first end 14 of tread surface 14. Step axle 49 supports a first step chain roller assembly 53 that travels along rail step chain roller track 9 on first rail 6 and a second step chain roller assembly (not shown) that travels along step chain roller track 11 on second rail 7. Step arm 40 also supports a step roller assembly 60 adjacent to second end portion 34 of riser surface 13. Step roller assembly 60 travels along step roller track 8 on first rail 6. A second step roller assembly 62 that is configured to travel along step roller track 10 on second rail 7 is supported by the second step arm (not shown). Other chain rollers 63 and 64 are also shown in FIG. 1

Figure 2:
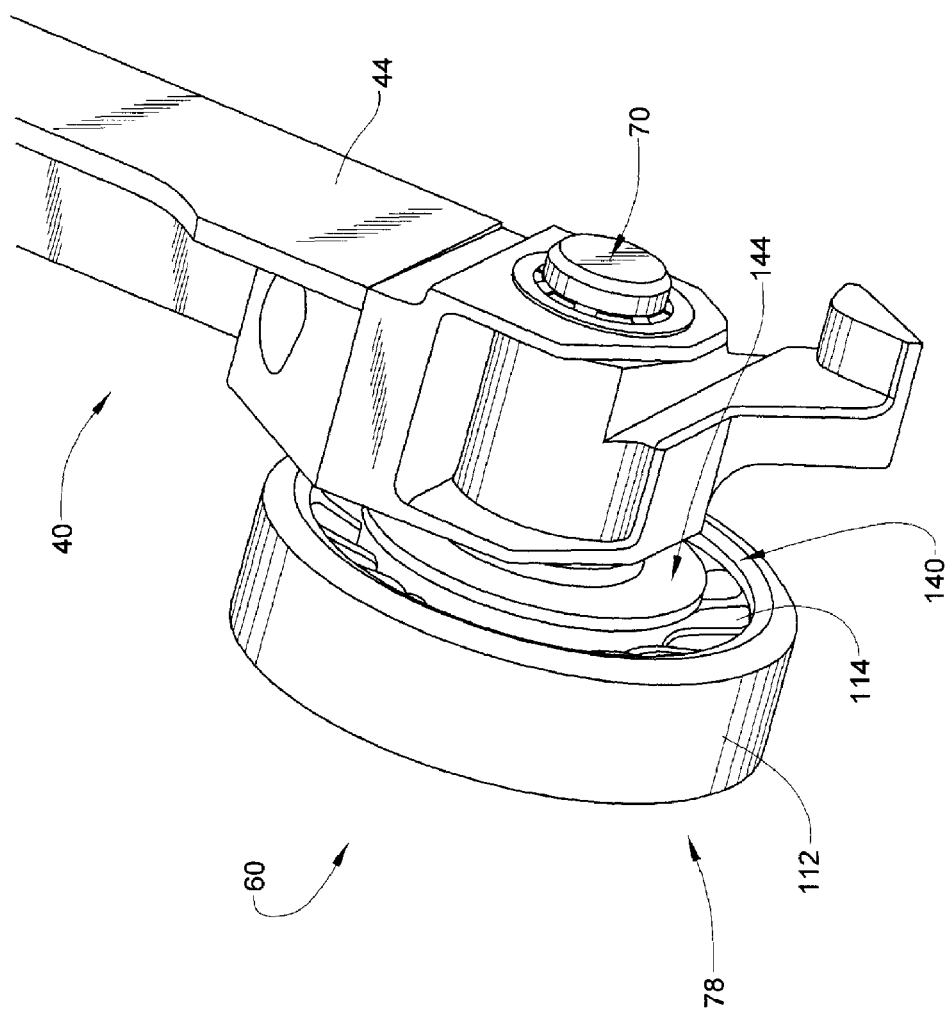
FIG. 2 is a perspective view of a step roller assembly of FIG. 1.
Figure 3:
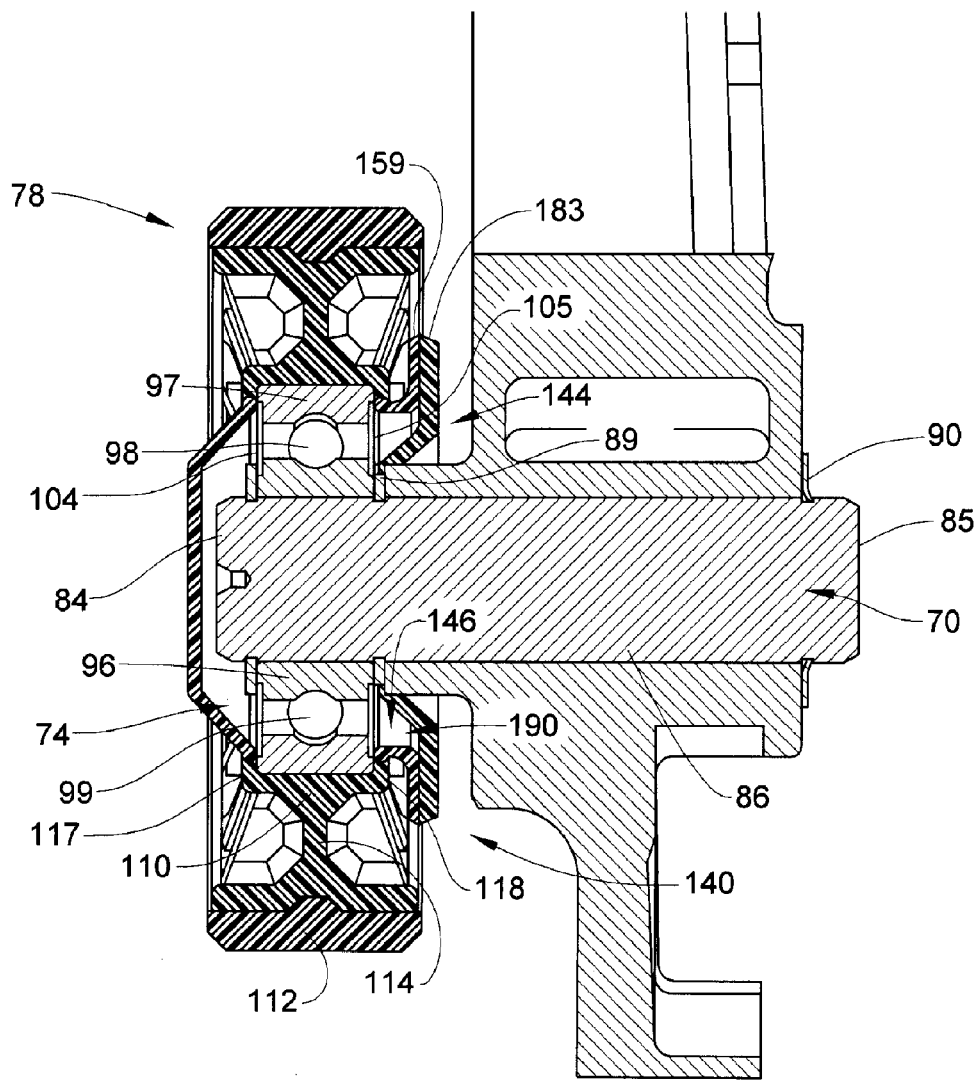
FIG. 3 is a cross-sectional side view of the roller assembly of FIG. 2.

Reference will now be made to FIGS. 2-3 in describing step roller assembly 60 with an understanding that step roller assembly 62 includes similar structure. Step roller assembly 60 includes an axle member 70, a bearing member 74 and a roller member 78. Axle member 70 is mounted in second end section 44 of step arm 40 and includes a first end 84 that extends to a second end 85 through an intermediate portion 86. Axle member 70 is constrained from shifting axially relative to step arm 40 by first and second clip members 89 and 90. First clip member 89 is fitted into a first groove (not separately labeled) formed in intermediate portion 86 of axle member 70. Second clip member 90 is fitted into a second groove (also not separately labeled) arranged at second end 85 of axle member 70.

Bearing member 74 is mounted to intermediate portion 86 of axle member 70 between first end 84 and first clip member 89. Bearing member 74 includes an inner race 96 that is press-fit to axle member 70 and an outer race 97. Outer race 97 rotates relative to inner race 96 upon a plurality of balls, two of which are shown at 98 and 99. Bearing member 74 is mounted to axle member 70 to rotatably support roller member 78. Bearing member 74 also includes first and second bearing seals 104 and 105 that extend between inner and outer races 96 and 97. Bearing seals 104 and 105 protect bearing 98 and 99 from foreign debris and also can retain any lubricant that may be applied to bearing member 74.

Roller member 78 is mounted to bearing member 74. More specifically, roller member 78 includes an inner hub 110 that receives outer race 97 of bearing member 74. Inner hub 110 is joined to an outer diametric surface 112 by a plurality of spoke members, one of which is indicated at 114. Inner hub 110 includes a first annular rim 117 and a second annular rim 118. First and second annular rims 117 and 118 constrain axial movement of roller member 78 relative to bearing member 74. A seal assembly 140 is positioned about axle member 74 and covers inner hub 110. Seal assembly 140 serves to further shield bearing member 74 from foreign debris. Seal assembly 140 includes a rotating member 142 and a stationary member 144 that combine to form an annular cavity 146. As will become more fully evident below, rotating member 142 is mounted to inner hub 110 and secured to second annular rim 118. Stationary member 144 is mounted to axle member 70 at the first groove (not separately labeled).

Figure 4:
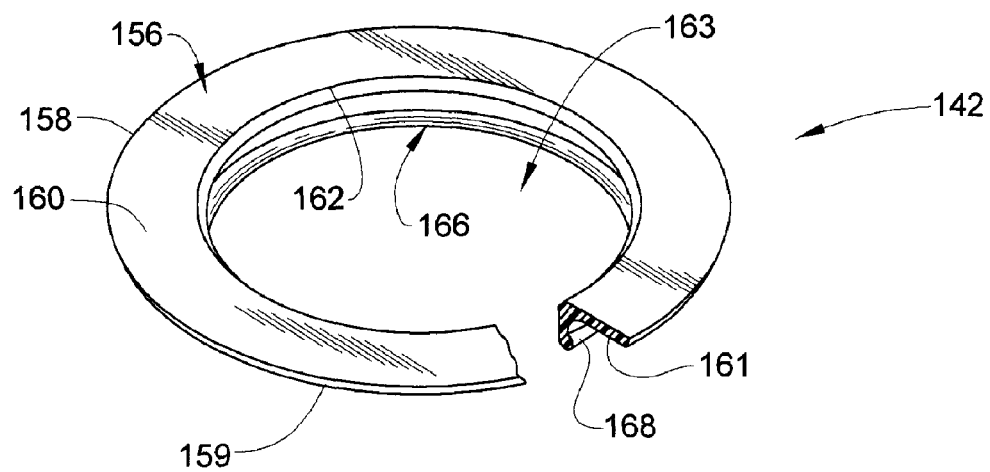
FIG. 4 is a partial perspective view of a rotating member of the seal assembly in accordance with an exemplary embodiment.

As best shown in FIG. 4, rotating member 142 includes a shield portion 156 having an outer circumferential edge 158 having a first angular surface 159. Shield portion 156 also includes a first surface portion 160, a second, opposing surface portion 161, and an inner diametric edge portion 162 that defines a central opening 163. Rotating member 142 includes a mounting member 166 that extends axially outwardly relative to shield portion 156 from inner diametric edge portion 160. Mounting member 166 includes a circumferential lip portion 168. Circumferential lip portion 168 extends radially inwardly from mounting member 166 into central opening 163. Circumferential lip portion 168 is configured to engage with second annular rim 118 to secure rotating member 142 to roller member 78.

Figure 5:
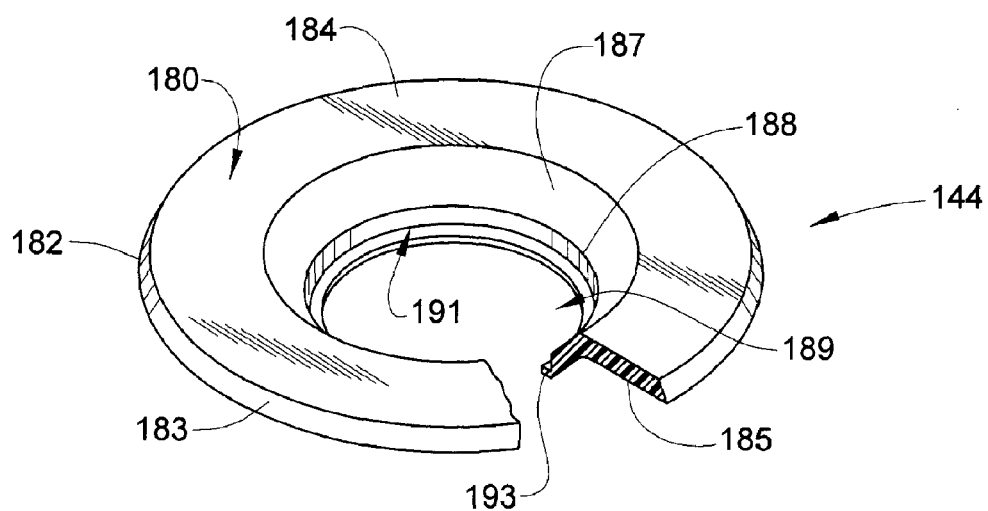
FIG. 5 is a partial perspective view of a stationary member of the seal assembly in accordance with an exemplary embodiment.

Reference will now follow to FIG. 5 in describing stationary member 144. Stationary member 144 includes a shield element 180 including an outer circumferential edge section 182 having a second angled surface 183. Shield element 180 also includes a first surface section 184, a second opposing surface section 185, and an annular tapered portion 187 that extends to an inner diametric edge section 188 that defines a central aperture 189. Stationary member 144 also includes a mounting element 191 that extends axially outwardly relative shield element 180 from annular tapered portion 187. Mounting element 191 includes a circumferential lip portion 193 that extends radially outwardly relative to central aperture 189. Circumferential lip portion 193 is configured to engage with first clip member 89 to secure stationary member 144 to axle member 70.

With this arrangement, rotating member 142 and stationary member 144 provide a dual layer of protection for step roller assembly 60. More specifically, rotating member 142 shields bearing member 74 from foreign debris and/or moisture while stationary member 144 prevents foreign debris and/or moisture collecting at axle member 70. Moreover, the differential motion of the rotating member 142 relative to stationary member 144 creates a pressure differential. In particular, the axially close proximity of radially extending surface portion 160 and radially extending surface section 184 generates a velocity difference during movement that increases in the radially outward direction. Based on Bernoulli's Principle, pressure on an outer diameter (not separately labeled) of seal assembly 140 is therefore lower than pressure on an inner diameter (also not separately labeled) of seal assembly 140 created by the velocity difference generated by rotation of rotating member 142. This pressure differential further inhibits any debris from passing toward the bearing member by urging any foreign matter outward, away from the seal assembly. In addition, annular cavity 146 may be filled with a lubricant, such as grease to still further shield bearing member 74 from foreign debris and/or moisture. Given the pressure gradient created by the rotation of the rotating member 142, the lubricant may take the form of a low specific weight/high viscosity fluid such as a high viscosity grease in accordance with one aspect of the exemplary embodiment. The additional benefit of using such a lubricant in annular cavity 146 is that any moisture that enters annular cavity 146 will be urged both by the pressure gradient and force of gravity to be expelled from the bottom of the seal assembly. Furthermore, when mounted, first angled surface 159 of rotation member 142 and second angled surface 183 on stationary member 144. That is, first and second angled surfaces 159 and 183 cooperate to form a conical surface (not separately labeled) that directs moisture away from annular cavity 190. In this manner, seal assembly 140 serves to enhance an overall operational life of step assembly 2. It should also be understood that while shown in connection with the step rollers, the seal assembly of the exemplary embodiment could be employed on the rollers supported by the step axle or other chain rollers. Furthermore, it should be understood that while described in connection with an outdoor escalator, the seal assembly could also be provided on escalators designed for indoor use, on moving walks or other forms of passenger conveyors, or on any bearing assembly that requires protection from foreign debris.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A passenger conveyor assembly comprising:
   a roller assembly including an axle member, a bearing member mounted to the axle member, and a roller member rotatably mounted to the bearing member; and
   a seal assembly mounted to the roller assembly, the seal assembly including a rotating member mounted for rotation with the roller member and a stationary member fixedly mounted relative to axel member, the rotating member and the stationary member forming an annular cavity, the rotating member and stationary member cooperating to establish a pressure gradient at the annular cavity that substantially prevent foreign objects from accumulating at one of the bearing member and the axle member.

2. The passenger conveyor assembly according to claim 1, wherein the rotating member includes a shield portion having an outer circumferential edge portion that defines a first surface portion and an opposing second surface portion and central opening, and a mounting member extending axially outwardly relative to shield portion;
   wherein the rotating member includes a circumferential lip portion that extends from the mounting member radially outwardly relative to the central opening;
   wherein the roller member includes a hub portion having an annular rim, the circumferential lip portion of the rotating member being received by the annular rim to secure the rotating member relative to the roller member;
   wherein the stationary member includes a shield element having an outer circumferential edge section that defines a first surface section and an opposing second surface section and a central aperture, and a mounting element extending axially outwardly relative to the shield element; and
   wherein the stationary member includes a circumferential lip section that extends radially inwardly from the mounting element, the lip section engaging with a portion of the passenger conveyor to retain the stationary member.

3. The passenger conveyor assembly according to claim 2, wherein one of the first surface portion and the second surface portion of the rotating member abuts one of the first surface section and the second surface section of the stationary member forming an annular cavity therebetween.

4. The passenger conveyor assembly according to claim 3, further comprising: a lubricant substantially filling the annular cavity.

5. The passenger conveyor assembly according to claim 4, wherein the lubricant is a high viscosity low specific weight lubricant.

6. The passenger conveyor assembly according to claim 3, wherein the surface section and the surface portion extend radially and in close axial proximity.

7. The passenger conveyor assembly according to claim 1, wherein the passenger conveyor is one of an escalator and a moving walk.

8. The passenger conveyer assembly according to claim 7, wherein the roller assembly is one of a step roller, a step axle roller, and a chain roller.

9. The passenger conveyor assembly according to claim 1, wherein the rotating member includes a first angled surface on an outer circumferential edge portion and the stationary member includes a second angled surface on an outer circumferential edge section, the first and second angled surfaces cooperating to form a conical surface that is configured and disposed to direct foreign objects away from an interface of the rotating member and the stationary member.

10. A seal assembly comprising:
    a rotating member configured and disposed to be mounted for rotation with a roller member; and
    a stationary member configured and disposed to be fixedly mounted relative to an axel member, the rotating member and the stationary member forming an annular cavity, the rotating member and stationary member cooperating to establishing a pressure gradient at the annular cavity that substantially prevent foreign objects from contacting one of an associated bearing member and the axle member.

11. The seal assembly according to claim 10, wherein the rotating member includes a shield portion having an outer circumferential edge portion that defines a first surface portion and an opposing second surface portion and central opening, and a mounting member extending axially outwardly relative to the shield portion
    wherein the rotating member includes a circumferential lip portion that extends from the mounting member radially outwardly relative to the central opening;
    wherein the roller member includes a hub portion having an annular rim, the lip portion of the rotating member being received by the annular rim to secure the rotating member on the roller member;
    wherein the stationary member includes a shield element having an outer circumferential edge section that defines a first surface section and an opposing second surface section and a central aperture, and a mounting element extending axially outwardly relative to the shield element; and
    wherein the stationary member includes a circumferential lip section that extends radially outwardly from the mounting element relative to the central aperture, the lip section being configured and disposed to engage with an element of the assembly to retain the stationary member.

12. The seal assembly according to claim 11, wherein one of the first surface portion and the second surface portion of the rotating member abuts one of the first surface section and the second surface section of the stationary member forming an annular cavity therebetween.

13. The seal assembly according to claim 12, further comprising: a lubricant substantially filling the annular cavity.

14. The seal assembly according to claim 12, wherein the surface section and surface portion extend radially and in close axial proximity.

15. The seal assembly according to claim 11, wherein the lubricant is a high viscosity low specific weight lubricant.

16. The seal assembly according to claim 10, wherein the seal assembly is integrated into an escalator or moving walk.

17. The seal assembly according to claim 16, wherein the seal assembly is integrated into a roller assembly in one of: step roller, step axle roller or chain roller.

18. The seal assembly according to claim 10, wherein the rotating member includes a first angled surface on an outer circumferential edge portion and the stationary member includes a second angled surface on an outer circumferential edge portion, the first and second angled surfaces cooperating to form a conical surface that is configured and disposed to direct foreign objects away from an interface of the rotating member and the stationary member.

* * * * *